INVENTORS
NILS O. ROSAEN
BORJE O. ROSAEN
OSCAR E. ROSAEN
BY Hauke & Hauke
ATTORNEYS

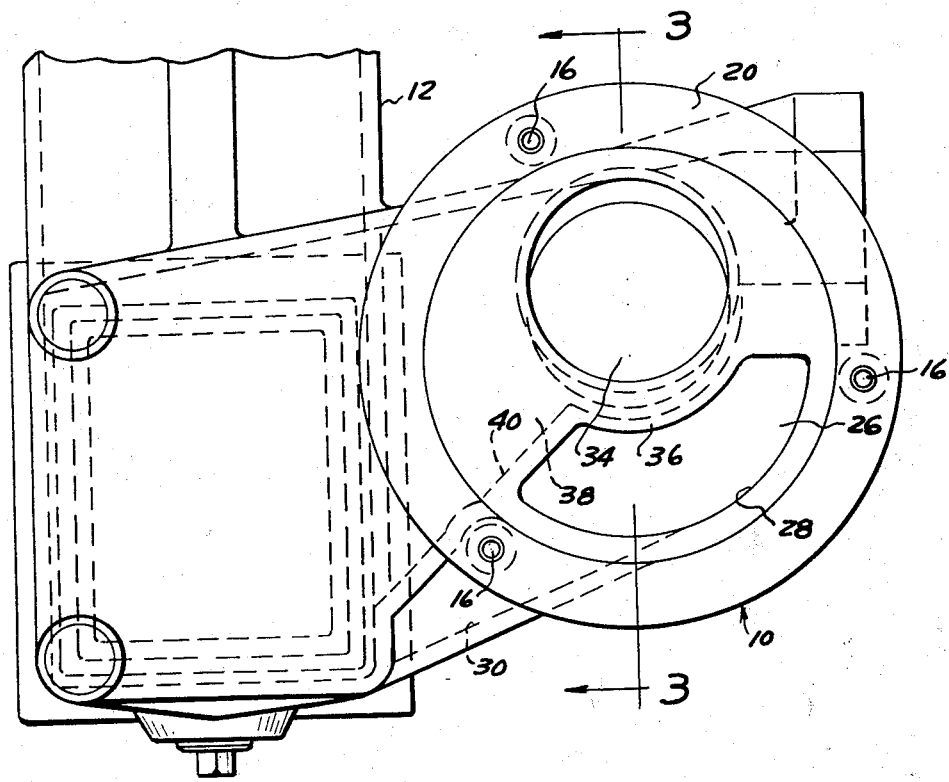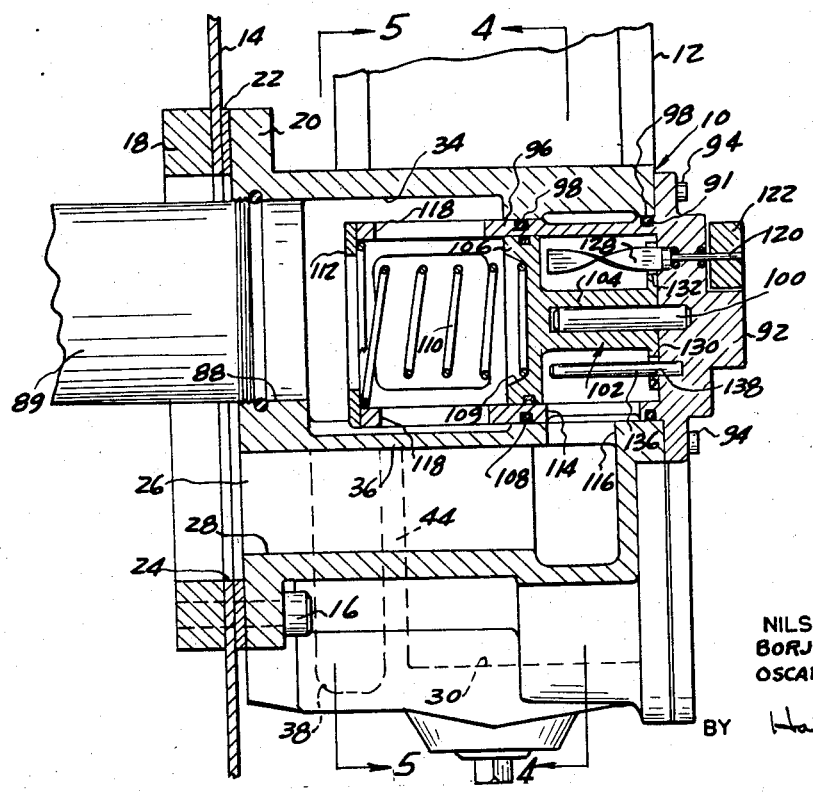

INVENTORS
NILS O. ROSAEN
BORJE O. ROSAEN
OSCAR E. ROSAEN

BY Hauke & Hauke

ATTORNEYS

United States Patent Office 3,441,137
Patented Apr. 29, 1969

3,441,137
FILTERING DEVICE
Nils O. Rosaen, Bloomfield Hills, Borje O. Rosaen, Ann Arbor, and Oscar E. Rosaen, Grosse Pointe, Mich., assignors, by mesne assignments, to Parker-Hannifin Corporation, Cleveland, Ohio, a corporation of Ohio
Filed Jan. 24, 1966 Ser. No. 522,773
Int. Cl. B01d 35/12, 35/02
U.S. Cl. 210—90
8 Claims

ABSTRACT OF THE DISCLOSURE

A filter device mounted to the exterior sidewall of a fluid reservoir includes a housing structure with a filter chamber connected to the interior of the reservoir and a tubular structure extending upwardly from the housing structure. The interior of the tubular structure is in open communication with the filter chamber and a flat filter element adapted to be mounted in the filter chamber is insertable and removable through the tubular structure.

---

Figure 6:
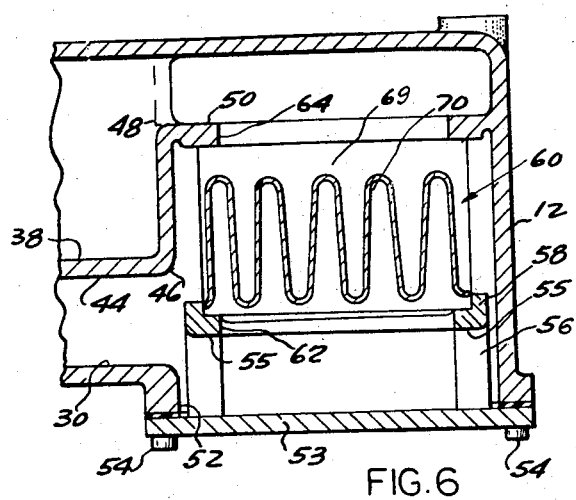

This invention relates to filtering devices and more particularly to an improved filter device constructed to permit continued operation of the system to which the device is connected while the filter element is being removed for cleaning or replacement.

Heretofore a number of filter devices have been provided which have permitted continued operation of the fluid system even as the filter element is being removed for purposes of cleaning or replacement. To my knowledge, however, each of these has included some type of valve means operable upon being actuated to close off portions of the filter device and to redirect fluid directly from the inlet to the outlet. Such valve means in addition to adding considerable cost to the filter devices by being expensive to manufacture and assemble also are subject to malfunction. When the valve means become worn or when the malfunction occurs there is no advance warning and removal of the filter element with the valve inoperative results in fluid flow from the open end of the device resulting in a difficult and time consuming clean up operation.

The present invention provides a filter device constructed to permit continued operation of the fluid system as the filter element is being removed for cleaning or replacement. The filter device does not utilize valve means for this purpose and thus a substantial reduction in cost is achieved and there is no danger of loss of system fluid or a difficult clean up operation resulting from malfunction of the valve means.

In addition, as will become more apparent as the description proceds, the filter device of the present invention includes means to visually indicate the condition of the filter element so that it can be cleaned or replaced prior to becoming unduly clogged. Also the device includes means automatically operable to open a bypass path around the filter element upon a predetermined degree of clogging of the element. An additional feature of the present construction and which will be described in detail below is that the filter device of the present invention is constructed to automatically purge air which might otherwise collect in the device. This purging is accomplished without expensive air evacuation means and takes place substantially continuously during operation of the system so that large air bubbles which would otherwise accumulate are not suddenly thrown into the system to interfere with the operation of the other components of the system.

It is an object then of the present invention to reduce the costs of continuous fluid systems by providing a filter device for such systems constructed to permit the filter element to be removed for cleaning or replacement without disrupting the operation of the system and without the necessity of providing valve means within the filter device for redirecting fluid flow as the filter element is removed.

It is another object of the present invention to improve the functioning of those filter devices provided with means for permitting the removal of the filter element without interrupting the operation of the filter system by providing a new filter device constructed to automatically direct fluid from the inlet to the outlet upon removal of the filter element without requiring the provision of valve means for this purpose.

It is yet another object of the present invention to improve the operation of fluid systems by providing a filter device having means operable to continuously bleed air from within the device.

It is yet another object of the invention to improve the filter devices of the aforementioned types by providing means indicating the clogged condition of the filter element of such devices and also means for automatically bypassing the filter element when it has become clogged to a predetermined degree.

Figure 1:
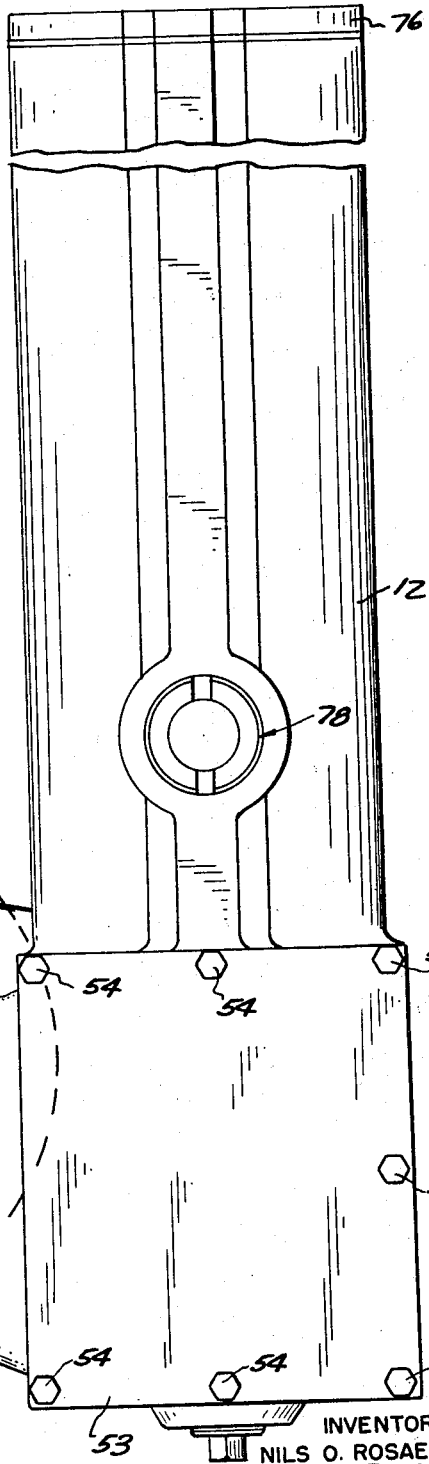

Other objects and advantages of the present invention will readily occur to one skilled in the art to which the invention pertains upon reference to the following description. The description makes reference to the following drawings in which like reference characters refer to like parts throughout the several views and in which:

FIG. 1 is a front elevational view of the preferred filter device of the present invention and illustrating schematically other portions of the preferred fluid system connected with the filter device.

Figure 4:
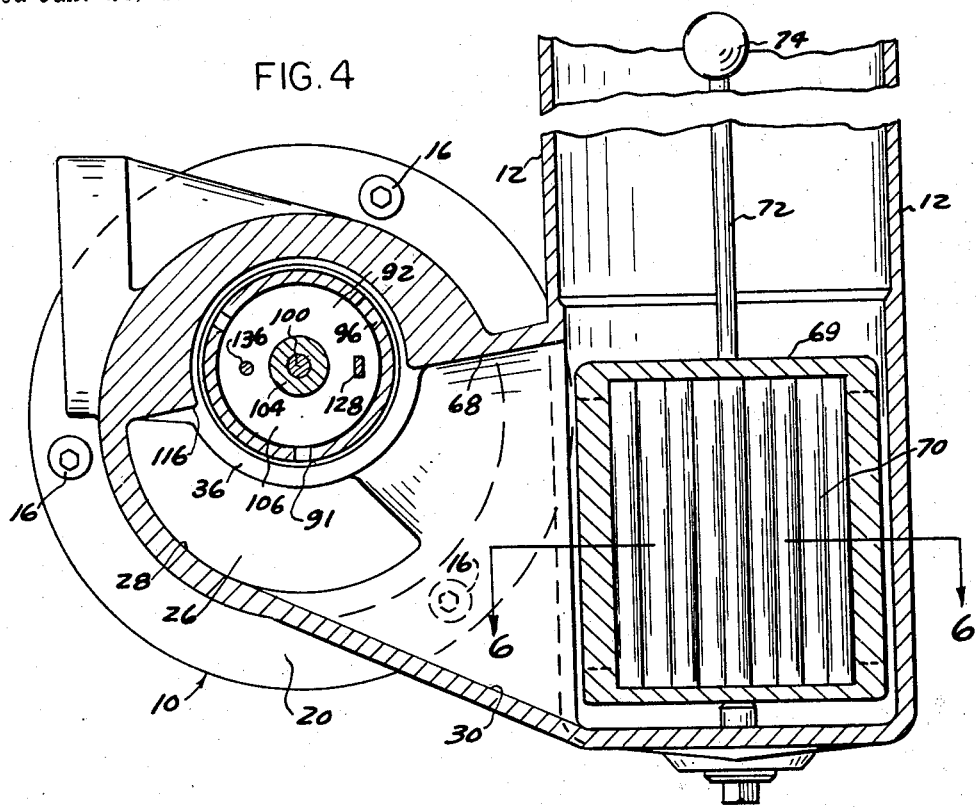
Figure 5:
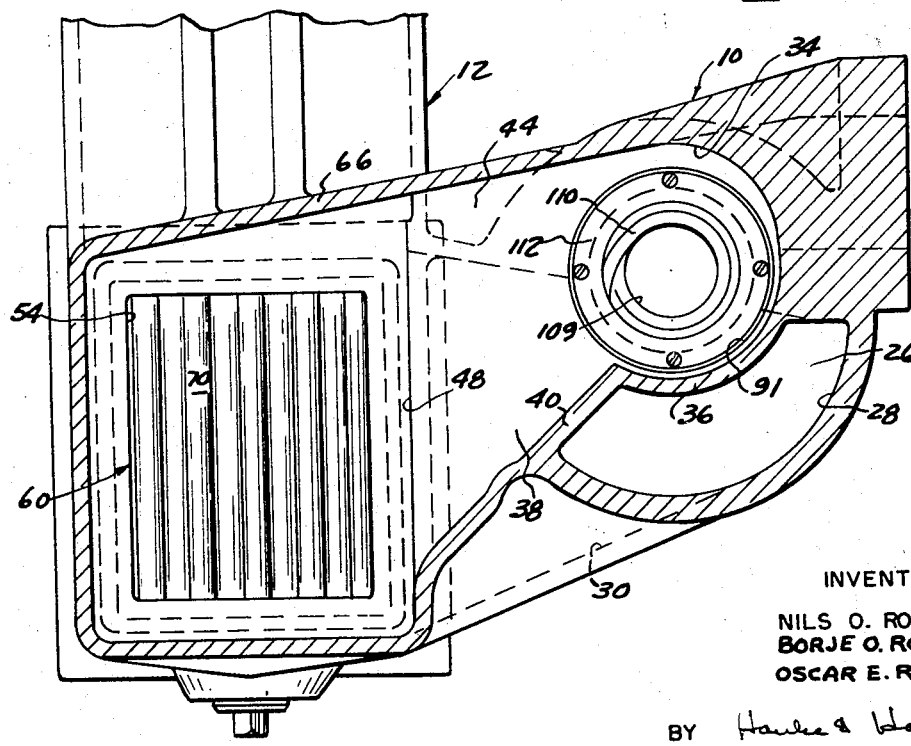

FIG. 2 is a rear fragmentary elevational view of the filter device illustrated in FIG. 1, FIG. 3 is a fragmentary cross sectional view taken substantially on line 3—3 of FIG. 2, FIG. 4 is a fragmentary cross sectional view taken substantially on line 4—4 of FIG. 3, FIG. 5 is a fragmentary cross sectional view taken substantially on the line 5—5 of FIG. 3, FIG. 6 is a fragmentary cross sectional view taken substantially on line 6—6 of FIG. 4.

Now referring to the drawings for a more detailed description of the present invention, FIGS. 1 and 2 illustrate a preferred filter device as comprising a substantially cylindrical housing 10 integrally joined with a tubular vertically extending housing 12. As can best be seen in FIG. 3, the housing 10 is adapted to be mounted to the wall of a fluid reservoir 14 by means of a plurality of screws 16. As also shown in FIG. 3, if preferred, a mounting plate 18 can be positioned on the interior side of the wall of the fluid reservoir 14 for receiving the mounting screws 16. The screws 16 are preferably carried in an annular flange portion 20 of the housing 10 and a gasket 22 is disposed intermediate the flange portion 20 and the wall of the reservoir 14. The wall of the reservoir 14 is preferably provided with a circular opening 24 encompassed by the mounting plate 18 and the flange portion 20 of the housing 10.

The housing 10 is, as can best be seen in FIGS. 2-5, internally cored to provide an inlet chamber 26 open to the interior of the fluid reservoir 14 through the opening 24 and through an arcuate inlet 28 provided in the housing 10. The inlet chamber 26 extends axially within the housing 10 and as can best be seen in FIG. 4, is connected by an angular inlet passage 30 formed in the housing 10 and connecting the inlet chamber 28 to the interior of the tubular housing 12. An outlet chamber 34 is formed in the housing and is separated from the inlet chamber by an arcuate wall 36. The outlet chamber 34 is also connected with the interior of the tubular housing 12 by means of an outlet passage 38 which as can best be seen in FIGS. 5 and 6 is formed by a wall portion 40 integrally formed with the wall portion 36 and extending into the interior of the tubular housing member 12. A vertical wall 44 formed in the housing 10 and in the interior of the housing 12 separates the inlet passage 30 and the outlet passage 38 and joins with the wall portion 40 as can best be seen in FIG. 5.

As the device has thus far been described it is apparent that the housing 10 and the tubular housing 12 are integrally joined and formed and are disposed such that when the device is mounted to the wall of the reservoir 14 the longitudinal axis of the cylindrical housing 10 is substantially horizontal and extends outwardly from the reservoir wall while the longitudinal axis of the tubular housing 12 is substantially vertical. The housing 10 and the housing 12 are joined by the wall portions which form the passages 30 and 38 and these wall portions extend angularly downwardly with respect to the radii of the cylindrical housing 10 to position the lower portion of the tubular housing 12 below the housing 10. The inlet passage 30 and the outlet passage 38 extend from the interior of the housing 10 to the interior of the housing 12 in a side by side relationship separated by the wall 44 and the wall portions 36 and 40 and with the outlet passage 38 on the rear side of the device and the inlet passage 30 on the front side of the device.

As can best be seen in FIGS. 6, the wall 44 separating the inlet passage 30 and the outlet passage 38 is preferably curved as at 46 and 48 and extends across the lower portion of the tubular housing 12 to be integrally joined with one exterior wall thereof to provide a seat portion 50 intermediate the bend 48 and the wall of the housing member 12. A preferably rectangular opening 52 is provided in the lower portion of the tubular housing 12 in a wall thereof parallel to the wall 44 and opening to the inet passage 30. A cleanout cap 53 is removably secured to the tubular housing 12 by means of a plurality of screws 54 as can best be seen in FIG. 1 to close the opening 52. As can best be seen in FIG. 6, the cleanout cap 53 includes a preferably box like extension 56 extending into the inlet passage 30 and having a plurality of slots 55 in the sidewalls thereof to permit fluid passage between the inlet passage 30 and the interior of the extension 56 and a peripheral flange portion 58 which is adapted in combination with the seat portion 50 of the wall 44 to form a means for retaining a rectangular filter element 60 in place. The extension 56 and the seat portion 50 are respectively provided with openings 62 and 64 which permit fluid to flow from the inlet passage 30 through the filter element 60 and to the outlet passage 38.

As can best be seen in FIG. 5, the wall 40 defining the outlet passage 38 is provided with an upper substantially horizontally extending portion 66 which extends across a portion of the lower section of the tubular housing 12 and joins with the wall 44 to separate the outlet passage 38 from the remainder of the interior of the tubular housing 12 except of course for that communication afforded through the filter element 60. As can best be seen in FIG. 4, the upper wall 68 defining the inlet passage 30 terminates at the inner wall of the tubular housing member 12 so that the inlet passage 30 and the inlet side of the filter element 60 are open to the interior of the tubular housing 12.

The filter element 60, as can best be seen in FIGS. 4 and 6 preferably comprises a rectangular peripheral frame 69 having flat top, bottom and side members preferably formed of epoxy or any suitable material and providing the means for carrying flat filtering material 70 in a vertical position and formed in a plurality of vertically extending pleats as can best be seen in FIG. 6. As shown in FIG. 4, a handle 72 is fixed to the upper portion of the frame 69 and extends vertically through the tubular housing 12 and terminates preferably in a knob portion 74 disposed somewhat interiorly of the upper end of the tubular housing 12. The upper end of the tubular housing 12 is preferably closed by a removable cap 76. As can best be seen in FIG. 1, a sight glass 78 can be, if desired, provided in one of the walls of the tubular housing 12.

As can best be seen in FIG. 1, the housing 10 is provided with an outlet 80 which is connected with the outlet chamber 34 and which can be connected through suitable conduit 81 and through a suction pump 82 to a fluid user 84. As shown in FIG. 3, the housing 10 is provided with a second outlet 88 which preferably opens to the outlet chamber 34 through the opening 24 provided in the wall of the reservoir 14. The outlet 88 is adapted for connection through piping or conduit 89 disposed within the reservoir 14 and then can be connected by conduit 90 through the pump 82 and to the user 84 as shown in FIG. 1. It is to be understood that either both of the outlets 80 and 88 may be connected as shown schematically in FIG. 1 to a single fluid user and through a single pump or either one of the outlets can be so connected with the other outlet suitably plugged. It is also apparent that the outlets 80 and 88 could if desired be connected to two separate fluid systems.

As the invention has thus far been described, fluid is normally drawn from the reservoir 14 by the pump 82 through the inlet 28 into the inlet chamber 26 downwardly through the inlet passage 30 horizontally through the filter element 60 and from there upwardly through the outlet passage 38 to the outlet chamber 34 and from there through either or both of the outlets 80 and 88 to the user 84. The lower portion of the tubular housing 12 is preferably disposed below the floor of the reservoir 14 so that the lower portion of the housing 12 will be filled with fluid to a level equal to the level of the fluid in the reservoir. It is apparent therefore that the fluid will rise in the interior of the tubular housing 12 to a level well above the filter element 60 and the wall portion 68 so that there will be no possibility of air entering the system through the tubular housing 12.

When the filter element 60 becomes clogged, and it is desired to therefore remove it for purposes of either cleaning or replacing it, the cap 76 is removed while the system continues to operate. The knob 74 is grasped to pull the filter element 60 from the tubular housing 12. The removal of the filter element 60 is accomplished by simply lifting the filter element 60 from the fluid within the tubular housing 12 and this does not disturb the operation of the fluid system since fluid will continue to pass from the inlet passage 30 to the outlet passage 38. Air which might tend to be introduced into the system during removal of the filter element will rise to the top of the housing 12 and escape from the system.

It is apparent that the construction which has thus far been described provides a filter device in which the filter element can be readily changed or cleaned without disrupting operation of the system. The device, unlike previous similar devices, does not require expensive valve means which can malfunction and thereby create difficult clean up operations or render the device inoperative.

The filter device of the present invention also includes a means for indicating the condition of the filter and a bypass means automatically operable to open a bypass path directly from the inlet chamber 26 to the outlet chamber 34 upon a predetermined increase in the pressure differential across the filter element. Since the pressure differential across the filter element will increase as the filter element becomes clogged, the bypass path will therefore open upon the filter element becoming clogged a predetermined amount and before the filter element either diminishes flow to too great an extent or is in danger of rupturing.

As can best be seen in FIGS. 1, 3 and 4, the front portion of the housing 10 is provided with an opening 91 which is axially aligned with the outlet chamber 34. A cap 92 closes the opening 91 and is secured to the housing 10 by a plurality of screws 94. The cap 92 is provided with an inwardly extending cylindrical portion 96 which axially slidably engages the wall of the housing 10 defining the outlet chamber 34. O-ring seals 98 can be carried by the cylindrical portion 96 to prevent fluid leakage therepast. A pin 100 is carried by the cap 92 and extends axially into the outlet chamber 34 to provide the means for axially slidably mounting a piston 102. The piston 102 is provided with an axially elongated medial portion 104 encompassing the pin 100 and axially slidably carried thereon, and an interior radially enlarged portion 106 carrying a piston ring 108 engaging the interior surface of the cylindrical portion 96. The enlarged portion 106 is provided with a recess 109 on its innermost face which forms the seat for one end of a spring 110. The opposite end of the spring 110 is seated against an inwardly formed flange portion 112 provided at the end of the cylindrical portion 96 so that the piston 102 is urged toward the cap 92.

The cylindrical portion 96 is provided with a plurality of arcuate openings 114 disposed in registry with openings 116 provided in the wall intermediate the inlet chamber 26 and the outlet chamber 34 to thereby expose the outermost surface of the piston 102 to the pressure of the fluid within the inlet chamber 26. The cylindrical portion 96 is also provided with a plurality of annularly spaced openings 118 axially inwardly spaced from the openings 112 and in registry with the outlet chamber 34 to expose the innermost face of the piston 102 to pressure in the outlet chamber 34. The piston 102 will normally assume the position indicated in FIG. 3 with the spring 110 urging the piston 102 against the cap 92. When the filter element 60 has become clogged sufficiently to produce an increase in pressure on the inlet side thereof, this increased pressure will be transmitted through the openings 114 and 116 to urge the piston 102 axially to the left as seen in FIG. 3. When the pressure differential across the piston 102 has become sufficiently high to move the piston 102 to a position in which the enlarged portion thereof is to the left of the openings 118, a fluid path will be opened directly from the inlet chamber 26 to the outlet chamber 34 through the cylindrical portion 96.

It is apparent that the axial position of the piston 102 will depend upon the pressure differential across the filter element 60 and therefore will depend upon the degree of clogging of the element 60. Thus by providing a means for indicating the position of the piston 102, such means will also indicate the condition of the filter element 60. Such means are provided in the present invention in the form of a shaft 120 carried by the cap 92 and having fixed thereto at the exterior end thereof a pointer element 122 as can best be seen in FIG. 1. The pointer element 122 rotates with the shaft 120 and points to suitable indicia 124 provided on an indicator plate 126 carried on the exterior surface of the cap 92. The interior end of the shaft 120 has fixed thereto to extend axially therefrom an actuator element 128. The actuator element 128, as can best be seen in FIG. 3, comprises a flat strip of material having a uniform twist about its longitudinal axis from end to end thereof. The piston member 102 is provided at its outermost end of the elongated portion 104 with a radially outwardly extending flange portion 130 which normally abuts the cap 92. The flange 130 is provided with a rectangular slot 132 which receives the actuator element 128. Thus axial movement of the piston 102 causes the sides forming the slot 132 to engage the sides of the actuator element 128 and produces rotation thereof which corresponds directly with the axial movement of the piston 102. Rotation of the actuator element 128 produces a corresponding rotation of the pointer element 122 so that the pointer element 122 will point to the particular indicia 124 which indicates the condition of the filter element. A guide pin 136 is secured to the cap 92 and extends through a suitable opening 138 provided in the flange portion 130 of the piston 102.

It is apparent that a filter device has been described which is constructed to permit the filter element to be removed for cleaning and/or replacement without disrupting the operation of the system and without the necessity of providing valve means within the filter device for redirecting fluid flow as the filter element is removed. A filter device is also provided in which air is continuously purged from the system during the operation thereof. The wall 68 forming the upper portion of the inlet passage 30 is formed to extend angularly upwardly into the interior of the tubular housing 12 as shown in FIG. 4. This directs air which may come into the filter device through the reservoir into the tubular housing 12 and out the top. If it is desired, a vent could be provided in the cap 76 of the tubular housing 12. The wall 68 is similarly sloped so that air on the outlet side of the filter element 60 is also directed upwardly from the filtering area before it has a chance to collect. The filter element 60 also contributes to this air purging by being positioned vertically so that there is no chance of air collecting and being trapped on the underside of the filter element as would be possible if the element were disposed horizontally. Thus air which might otherwise collect within the device is continuously purged so that it will not impair operation of the system.

This air purging feature of the filter device is important especially in those fluid systems which use a variable volume pump. In such systems when fluid flow is at the maximum rate air tends to collect on the filter element in a greater amount. As the pump volume is reduced, the pressure is also reduced permitting the air to rise from the element and enter the system in the form of large bubbles which can interfere with the operation of the system and the operation of the pump. The air purging feature of the device of the present invention avoids this problem.

It is also apparent that although I have described but one embodiment of my invention many changes can be made therein without departing from the spirit of the invention as expressed by the scope of the appended claims.

We claim:
1. In a fluid system having a fluid reservoir adapted to hold fluid at a predetermined level, a filter device comprising:
(a) a first housing portion mounted to said reservoir below the level of fluid therein having an inlet connected to said fluid reservoir and an outlet,
(b) a second housing portion connected with said first housing portion and comprising a vertically disposed elongated member forming a vertically elongated chamber which extends a distance above said fluid level,
(c) a filter element carried in said chamber and vertically removable from said second housing portion,
(d) passage means extending downwardly from said inlet to the lower portion of said second housing portion to connect said inlet with said chamber on one side of said filter element, and
(e) passage means extending upwardly from the lower portion of said second housing portion to said outlet to connect said outlet with the opposite side of said filter element.

2. The filter device as defined in claim 1 and including pressure responsive means exposed on one side to the pressure of fluid on the inlet side of said filter element and on the opposite side to the pressure of fluid on the outlet side of said filter element and being movable in response to a predetermined increase in the pressure differential across the filter element to a position opening a bypass path directly from the inlet to the outlet of said device.

3. The filter device as defined in claim 1 and including pressure responsive means exposed on one side to the pressure of fluid on the inlet side of said filter element and on the opposite side to the pressure of fluid on the outlet side of said filter element and being movable in response to changes in the pressure differential across said filter element and means operably connected to said pressure responsive means to visually indicate the position of said pressure responsive means exteriorly of said filter device.

4. The filter device as defined in claim 3 and including means actuated by said pressure responsive means to open a fluid path directly from said inlet to said outlet upon a predetermined increase in the pressure differential across said filter element.

5. The filter device as defined in claim 1 and in which
 (a) said second housing portion comprises a vertically disposed elongated tubular member,
 (b) a cap member closing the upper end of said tubular member, and
 (c) means vertically slidably receiving said filter element in the lower portion of said tubular member.

6. The filter device as defined in claim 5 in which said filter element is flat and is disposed in a vertical plane within said chamber.

7. The filter device as defined in claim 5 and in which said inlet and said outlet are each disposed above said filter element.

8. The device as defined in claim 1 and including a wall portion formed in said second housing portion and closing said second mentioned passage means from the interior of said second housing portion.

References Cited
UNITED STATES PATENTS

| | | | |
|---|---|---|---|
| 1,507,929 | 9/1924 | Mosher | 210—237 |
| 1,817,572 | 8/1931 | Linley et al. | 210—172 |
| 2,181,263 | 11/1939 | Dehn | 210—237 X |
| 3,029,836 | 4/1962 | Gruner | 210—90 X |
| 3,273,715 | 9/1966 | Rosaen | 210—90 |

SAMIH N. ZAHARNA, *Primary Examiner.*

U.S. Cl. X.R.

210—172, 238